May 24, 1955 A. COTSWORTH III 2,709,201

OSCILLATOR-KEYED AUTOMATIC GAIN CONTROL CIRCUIT

Filed March 13, 1951

INVENTOR.
ALBERT COTSWORTH III
BY Francis W. Crotty
HIS ATTORNEY 2,709,201
Patented May 24, 1955

2,709,201

OSCILLATOR-KEYED AUTOMATIC GAIN CONTROL CIRCUIT

Albert Cotsworth III, Oak Park, Ill., assignor to Zenith Radio Corporation, a corporation of Illinois Application March 13, 1951, Serial No. 215,237

1 Claim. (Cl. 178—7.3)

Figures 1, 2:
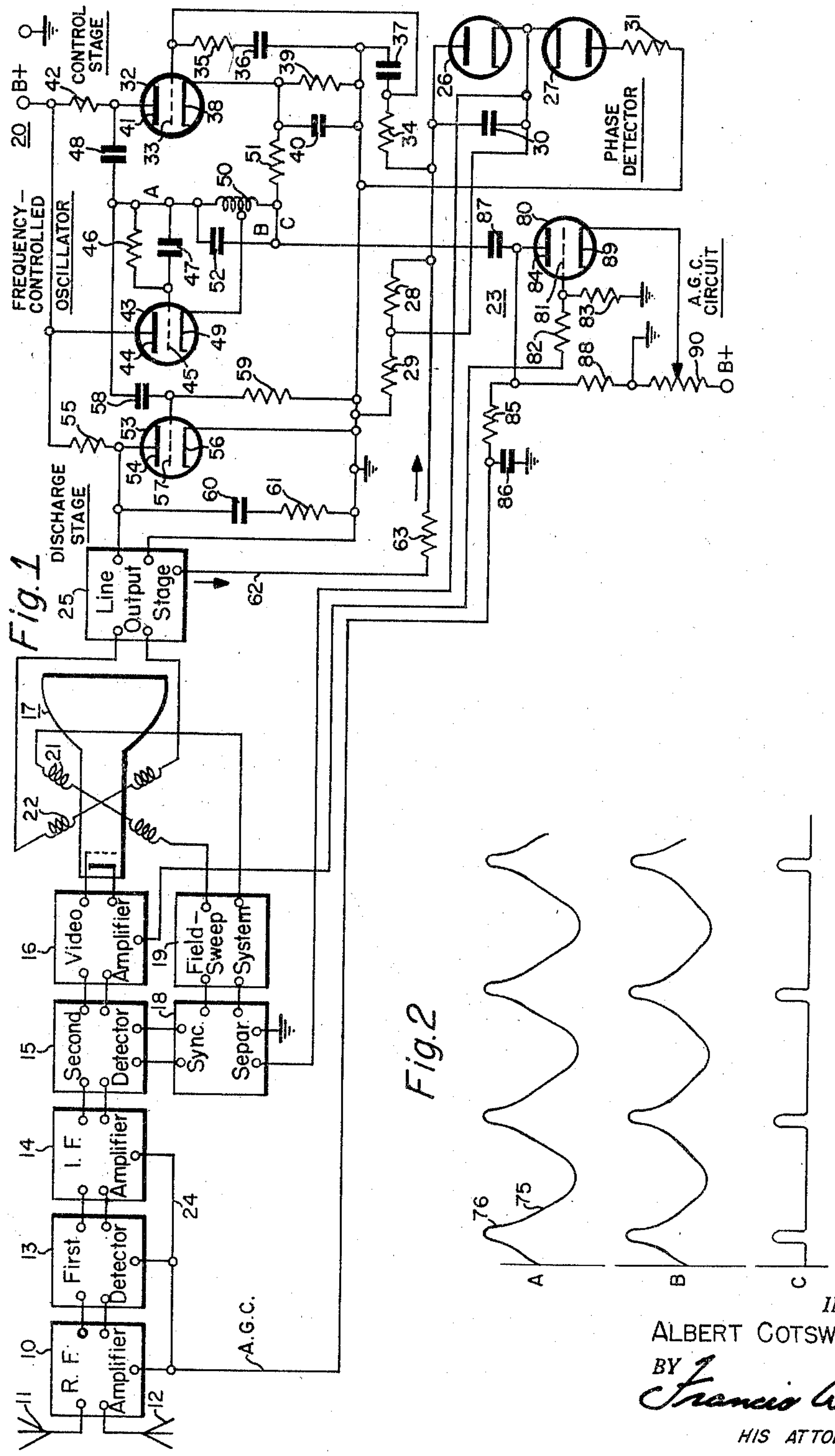

This invention relates to an improved television receiver including an automatic-gain-control system of the gated type.

One form of gated automatic-gain-control (AGC) system is disclosed in copending application Serial No. 39,368, filed July 18, 1948, now U. S. Patent No. 2,593,011, issued April 15, 1952, entitled "Automatic-Gain-Control Circuit for Television Receivers" by Albert Cotsworth III and assigned to the present assignee. The arrangement of this copending application utilizes the synchronizing components of a received television signal to derive a gain control potential and it is rendered sensitive only during the intervals in which such components occur. This is accomplished by a gating signal obtained from the line-sweep system of the receiver and utilized as an excitation potential for an electron-discharge device in the AGC system. One particular advantage of such a system is that the gain-control potential developed thereby is substantially independent of noise disturbances and the like occurring during line-trace intervals because the system is rendered insensitive to signals received during such intervals.

Usually the gating signal for an AGC system of the type under consideration is derived from the frequency-controlled oscillator in the line-sweep system of the television receiver. This oscillator is synchronized with the line-synchronizing components of a received television signal by means of a phase-detector and frequency-control circuit. The frequency-controlled oscillator of conventional line-sweep systems sometimes takes the form of a triode with a frequency-determining network coupled between its control electrode and cathode in which a sinusoidal signal is developed. The electron tube of the oscillator operates in class C mode and developes periodic pulses in its anode circuit. These pulses are differentiated so that they may have proper polarity and shape to trigger the discharge stage of the line-sweep system to which they are applied so as to control the line-sweep of the receiver reproducing device in synchronism with the incoming synchronizing components.

Where the periodic pulses are taken from the anode circuit of the oscillator, the differentiated pulses used for driving are inherently shifted in phase relative to the line-synchronizing components of the received television signal. It is desirable that the differentiated pulses be in phase with these synchronizing components for proper scanning, and for this reason it has been the practice to compensate for the above-mentioned phase shiftt. In effecting this compensation, the sinusoidal signal developed in the frequency-determining network of the oscillator becomes out of phase with the line-synchronizing components of the received television signal. This is inconvenient since this sinusoidal signal is used to gate the AGC system. In fact, it is necessary to provide a phase-shifting network between the oscillator and the AGC system so that the peaks of the sinusoidal gating signal occur in time coincidence with the synchronizing components.

The present invention provides a television receiver in which there is no inherent phase displacement between the sinusoidal signal developed by the frequency-controlled oscillator and the driving signal applied to the discharge stage of the line-sweep system. The positive peaks of the sinusoidal signal occur in time coincidence with the synchronizing components of the received signal and may be applied directly to the AGC system for gating purposes without the need of a phase-shifting network.

It is, accordingly, an object of this invention to provide an improved television receiver including an automatic-gain-control circuit and constructed so that a gating signal for the gain-control circuit may be derived in a simple and efficient manner.

A further object of the invention is to provide an improved television receiver including an automatic-gain-control circuit and so constructed that a properly phased gating signal may be supplied to the gain control circuit by means of a simple connection in which the requirement for a phase-shifting network is obviated.

The improved television receiver of the invention is constructed to utilize a television signal including video components and synchronizing components having an amplitude exceeding that of the video components. The line-sweep system of the receiver includes a frequency-controlled oscillator comprising an electron-discharge device having anode, cathode and control electrodes. A frequency-determining network is coupled to this discharge device for developing a sinusoidal signal, and a bias network causes the space current in the device to be pulsed in time coincidence with positive excursions of the sinusoidal signal. The line-sweep system also comprises a sawtooth generator and a coupling network, including a cathode impedance of the oscillator, for applying a driving signal to the saw tooth generator, the coupling network exhibiting substantially zero reactive impedance at the operating frequency of the oscillator to impart negligible phase shift to the driving signal. A control circuit controls the oscillator so that the positive excursions of its sinusoidal signal occur in time coincidence with the received synchronizing components. The receiver further comprises an automatic-gain-control system including a normally non-conductive electron-discharge device. A direct-current connection couples its cathode to a point of reference potential, while a coupling network couples its anode to the frequency-determining circuit of the oscillator for deriving a gating signal for the AGC system. The last-mentioned coupling network includes an alternating-current coupling impedance which exhibits substantially zero reactive impedance at the operating frequency. Finally, the receiver includes means for impressing the received television signal between the cathode and control electrode of the AGC tube so that the synchronizing components, in conjunction with the gating signal render the AGC tube conductive only for the duration of each of the synchronizing components to develop a gain-control potential.

The features of this invention which are believed to be new are set forth with particularity in the appended claim. The invention itself, however, together with further objects and advantages thereof may best be understood by reference to the following description when taken in conjunction with the accompanying drawing, in which:

Figure 1 shows a television receiver constructed in accordance with the invention, and Figure 2 includes several curves characterizing the signal developed by the synchronized oscillator of the receiver of Figure 1.

The television receiver illustrated in Figure 1 includes a radio-frequency amplifier 10 of one or more stages having input terminals connected to a suitable antenna circuit 11, 12 and output terminals connected to a first detector 13. First detector 13 is coupled to an intermediate-frequency amplifier 14 of any desired number of stages, and the intermediate-frequency amplifier is connected to a second detector 15. The output terminals of second detector 15 are connected to a video amplifier 16 of any desired number of stages and the video amplifier, in turn, is connected to the input electrodes of a cathode-ray image-reproducing device 17. Second detector 15 is further connected to a synchronizing-signal separator 18, unit 18 being connected to a field-sweep system 19 and to a line-sweep system 20. The output terminals of sweep systems 19, 20 are connected respectively to the field-deflection elements 21 and line-deflection elements 22 of reproducing device 17. An output circuit of video amplifier 16 is connected to an automatic-gain-control system 23 which may be connected to stages 10, 13 and 14 by way of lead 24 to control the gain of the television receiver in accordance with the intensity of the received television signals.

The television receiver may be tuned in a conventional manner to utilize a negatively-modulated television signal intercepted by antenna circuit 11, 12. This signal is amplified in radio-frequency amplifier 10 and heterodyned to the selected intermediate-frequency of the receiver in first detector 13. The resulting intermediate-frequency signal is amplified in amplifier 14 and detected in second detector 15 to produce a composite video signal. The composite video signal is amplified in video amplifier 16 and used to control the intensity of the cathode-ray beam developed in device 17 in accordance with the image intelligence of the received signal.

The synchronizing components of the received television signal are separated therefrom by synchronizing-signal separator 18 and are used to synchronize the operation of field-sweep system 19 and line-sweep system 20. Sweep systems 19, 20 apply field- and line-deflection currents to elements 21, 22 to control the scansion of the cathode-ray beam. In this manner, the reproducing device 17 is so controlled that it reproduces on its viewing screen images represented by the received television signal.

The composite video-signal obtained from video amplifier 16 is applied to AGC system 23 which utilizes the synchronizing components thereof to develop a control signal on leads 24 for controlling the gain of the receiver. The operation of automtic-gain-control circuit 23 is to be more fully described hereinafter.

Line-sweep system 20 is composed of a phase detector, a control stage, a frequency-controlled oscillator, a discharge stage, and an output stage, the latter being indicated by the block 25. The phase detector comprises a pair of diodes 26, 27 which may, if desired, be included within a single envelope. The cathodes of devices 26, 27 are connected together and to synchronizing-signal separator 18. The anode of diode 26 is connected to ground through series-connected resistors 28, 29, resistor 28 being shunted by a capacitor 30. The anode of diode 27 is connected to ground through a resistor 31.

The control stage comprises an electron-discharge device 32 having a control electrode 33 connected to the anode of diode 26 through a resistor 34, and connected to ground through a network comprising a resistor 35 and a capacitor 36 both shunted by a capacitor 37. Cathode 38 of device 32 is connected to ground through a resistor 39 which is shunted by a capacitor 40. Anode 41 of device 32 is connected to the positive terminal B+ of a unidirectional potential source through a resistor 42, the negative terminal of this source being connected to ground.

The frequency-controlled oscillator comprises an electron-discharge device 43 having an anode 44 directly connected to the positive terminal B+ of the unidirectional potential source. The control electrode 45 of device 43 is coupled to anode 41 of device 32 through a biasing network comprising a shunt-connected resistor 46 and capacitor 47, and through a coupling capacitor 48 series-connected with the network. The cathode 49 of device 43 is connected to a tap on an inductance coil 50, one extremity of coil 50 being connected to the junction of resistor 46 and capacitor 47 and its other extremity being connected to cathode 38 through a resistor 51. Resistor 51 and resistor 39, therefore, form a resistive impedance coupling cathode 49 to ground. Coil 50 is shunted by a capacitor 52 to form a frequency-determining circuit for the oscillator.

The discharge stage comprises an electron-discharge device 53 having an anode 54 connected to the positive terminal B+ of the unidirectional potential source through a resistor 55. The cathode 56 of device 53 is connected directly to ground and its control electrode 57 is coupled to the uppermost extremity of frequency-determining circuit 50, 52 through a coupling capacitor 58, the control electrode being connected to ground through a grid-leak resistor 59. A series-connected capacitor 60 and resistor 61 are connected between anode 54 and cathode 56 of device 53. Anode 54 is further connected to one of the input terminals of output stage 25, the other input terminal being connected to ground. Output stage 25 is further connected to the anode of diode 26 of the phase detector by means of a lead 62 and through a resistor 63.

Output stage 25 operates in well-known manner and develops a pulse on lead 62 during each of the line-retrace intervals. This pulse is integrated by the series-connected capacitor 30 and resistor 63 and the integrated pulses are compared in the phase detector with the incoming synchronizing components to produce, as is well known, a control signal across network 35—37 representing the phase of the incoming synchronizing components relative to the pulses developed on lead 62.

The frequency-determining circuit 50, 52 of the frequency-controlled oscillator establishes the free-running frequency of the oscillator at substantially the repetition frequency of the incoming line-synchronizing components. The control stage responds to the control signal developed across network 35—37 to maintain the frequency of the synchronized oscillator synchronized with the repetition frequency of the synchronizing components. Due to the action of biasing network 46, 47, the oscillator operates in class "C" mode and develops a composite signal across frequency-determining network 50, 52 as shown by curve A in Figure 2. This composite signal comprises a sine wave component 75 having a superposed pulse component 76 occurring during the peak positive excursions of each cycle of the sine wave as a result of pulses of space current developed in device 43 by biasing network 46, 47 during the positive excursions of the sine wave. The signal at the top B of inductance coil 50 connected to cathode 49 has a wave form as shown in curve B and is similar to the wave of curve A except that the sine-wave component has a decreased amplitude. The signal developed at point C is shown in the wave form C of Figure 2 and comprises solely the pulse component of the above-mentioned composite signal. The synchronization of the frequency-controlled oscillator with the incoming synchronizing components causes the pulse components of the signals developed by the oscillator, as shown in Figure 2, to occur in time coincidence with the incoming line-synchronizing components.

The discharge stage is shown in the drawing as connected to the point A of frequency-determining network 50, 52 through a coupling network including capacitor 58 and resistor 59 and further including the resistive impedance formed by resistors 39, 51. The coupling network applies the signal shown in the wave form of curve A of Figure 2 to control electrode 57 and the pulse component of this signal actuates the discharge stage. It is pointed out, however, that control electrode 57 may be connected to points B or C when so desired. The above-mentioned coupling network exhibits substantially zero reactive impedance at the operating frequency of the oscillator so that negligible phase shift is imparted to the signal applied to the discharge stage, and the discharge stage operates in well-known manner to establish a peaked saw-tooth wave across network 60, 61 synchronized as to frequency and phase with the sinusoidal signal of the oscillator and, hence, with the incoming synchronizing components. The saw-tooth wave is amplified in output stage 25 and acts to supply line-deflection currents to the deflection elements 22 of reproducing device 17. Point C is connected to cathode 38 of discharge device 32 to provide a fixed bias to this device, the pulses of wave form C being integrated to provide a constant bias across cathode resistor 39.

The automatic-gain-control system 23 comprises an electron-discharge device 80 having a control electrode 81 connected to an output circuit of video amplifier 16 through a resistor 82, and connected to ground through a resistor 83. Anode 84 of device 80 is connected to automatic-gain-control lead 24 through a resistor 85, the end of this resistor remote from anode 84 being by-passed to ground by a capacitor 86. The resistor 85 and capacitor 86 form a filter to remove the gating signal from the output of the automatic-gain-control circuit. Anode 84 is further coupled to point C of the oscillator through a network including a coupling capacitor 87 exhibiting substantially zero reactive impedance at the operating frequency of the oscillator, and is connected to ground through a load resistor 88. Cathode 89 of device 80 is connected to a movable tap on a potentiometer 90 connected between the positive terminal B+ of a source of unidirectional potential and ground.

Although anode 84 is shown as coupled to point C of the synchronized oscillator, it is to be understood that it may be connected to point B or A if desired. In the illustrated embodiment, the pulses developed at point C are applied to anode 84 and act as a gating signal. As previously pointed out, these pulses appear in time coincidence with the synchronizing components of the television signal and, due to the negligible reactive impedance of capacitor 87 at the operating frequency of the oscillator, they are applied to anode 84 with substantially no phase shift, so that the gating signal likewise is in phase with the synchronizing components. The composite video-signal from video amplifier 16 is applied to control electrode 81, and the bias of cathode 89 is adjusted by variation of the movable tap on potentiometer 90 so that current flows through device 80 only upon the coincident application of the synchronizing components of the video signal on control electrode 81, and the gating signal applied to anode 84. Current flow through device 80 causes a potential drop across load resistor 88 which is negative with respect to ground, and has potential variations indicating variations in intensity of the received television signal.

This invention provides, therefore, an improved television receiver including an automatic-gain-control system, the receiver being so constructd that a gating signal for the automatic-gain-control system may be obtained from the line-sweep system of the receiver without the requirement of a phase-shifting circuit. Moreover, the line-sweep system of the receiver requires no differentiating network between the frequency-controlled oscillator and the discharge stage because the driving signal produced by the oscillator has positive peak portions occurring at proper times to be applied directly to the discharge stage for triggering purposes.

While a particular embodiment of the invention has been shown and described, modifications may be made and it is intended in the appended claim to cover all such modifications as fall within the true spirit and scope of the invention.

I claim:

A television receiver for utilizing a negatively-modulated television signal including video components and synchronizing components comprising: a continuous wave oscillator including an electron-discharge device having an anode connected to a first point of reference potential and further having a control electrode and a cathode, circuit means including a resonant frequency-determining network and a series-connected resistive impedance coupled in that order between said control electrode and a second point of reference potential, a connection from said cathode to a tap on said frequency-determining network, a bias network included in said circuit means between said control electrode and said frequency-determining network for effecting Class C operation in said device; a saw-tooth generator; a coupling network extending from said circuit means to said saw-tooth generator for applying a driving signal to said saw-tooth generator and exhibiting substantially zero reactive impedance at the operating frequency of said oscillator; a control circuit coupled to said circuit means for supplying a control signal to said oscillator to synchronize the frequency and phase of said oscillator with said synchronizing components; an automatic-gain control circuit including a normally non-conductive electron-discharge tube having an anode, a cathode, and a control electrode; a direct current connection coupling said last-mentioned cathode to said second point of reference potential; a network consisting of a condenser coupled to said last mentioned anode from a point on said circuit means at which positive-polarity keying pulses are available at the times of occurrence of said synchronizing components and a resistance connecting said last-mentioned anode to said second point of reference potential, said network exhibiting substantially zero reactive impedance at the operating frequency of said oscillator, for keying said tube into conductivity in synchronism with said synchronizing components; and means for impressing said television signal between said last-mentioned cathode and control electrode.

References Cited in the file of this patent

UNITED STATES PATENTS

| | | |
|---|---|---|
| 2,538,519 | Holst | Jan. 16, 1951 |
| 2,559,038 | Bass | July 3, 1951 |

FOREIGN PATENTS

| | | |
|---|---|---|
| 507,239 | Great Britain | June 6, 1939 |

OTHER REFERENCES

Rider's TV Manual, vol. 3, Zenith TV, page 3–17, 18, chassis 27F20.

Rider's Television Manual, vol. 3, Zenith TV, page 3–13, 14, (Zenith chassis 28F20), November 1949.